(12) United States Patent
Mukai et al.

(10) Patent No.: US 8,845,776 B2
(45) Date of Patent: Sep. 30, 2014

(54) LEAD-FREE COPPER-BASED SINTERED SLIDING MATERIAL AND SLIDING PARTS

(75) Inventors: Ryo Mukai, Kashima (JP); Atsushi Koyama, Toyota (JP); Nahomi Hamaguchi, Toyota (JP); Kao Mouri, Toyota (JP); Hiromi Yokota, Toyota (JP)

(73) Assignee: Taiho Kogyo Co., Ltd., Aichi (JP)

( * ) Notice: Subject to any disclaimer, the term of this patent is extended or adjusted under 35 U.S.C. 154(b) by 94 days.

(21) Appl. No.: 13/265,248

(22) PCT Filed: Apr. 27, 2010

(86) PCT No.: PCT/JP2010/057424
§ 371 (c)(1),
(2), (4) Date: Dec. 29, 2011

(87) PCT Pub. No.: WO2010/126026
PCT Pub. Date: Nov. 4, 2010

(65) Prior Publication Data
US 2012/0096988 A1   Apr. 26, 2012

(30) Foreign Application Priority Data
Apr. 28, 2009   (JP) .............................. 2009-109637

(51) Int. Cl.
| | |
|---|---|
| C22C 9/02 | (2006.01) |
| C22C 1/05 | (2006.01) |
| C22C 9/04 | (2006.01) |
| C22C 9/01 | (2006.01) |
| C22C 9/00 | (2006.01) |
| F16C 33/12 | (2006.01) |
| C22C 9/06 | (2006.01) |

(52) U.S. Cl.
CPC . *F16C 33/12* (2013.01); *C22C 1/05* (2013.01); *C22C 9/02* (2013.01); *C22C 9/04* (2013.01); *Y02T 10/865* (2013.01); *C22C 9/01* (2013.01); *C22C 9/00* (2013.01); *C22C 9/06* (2013.01)
USPC .................. 75/230; 75/231; 75/234; 75/247

(58) Field of Classification Search
USPC .......................................... 75/247, 234, 235
See application file for complete search history.

(56) References Cited

U.S. PATENT DOCUMENTS

| | | | | |
|---|---|---|---|---|
| 5,259,860 A | * | 11/1993 | Ikenoue et al. | 75/231 |
| 5,326,384 A | * | 7/1994 | Asada et al. | 75/231 |
| 5,637,132 A | * | 6/1997 | Matthews et al. | 75/252 |
| 6,214,080 B1 | * | 4/2001 | Narasimhan et al. | 75/255 |
| 6,254,701 B1 | | 7/2001 | Oshiro et al. | |
| 6,348,114 B1 | | 2/2002 | Oshiro et al. | |
| 2003/0064239 A1 | * | 4/2003 | Saitou et al. | 428/553 |
| 2003/0068106 A1 | | 4/2003 | Greene et al. | |
| 2006/0260436 A1 | * | 11/2006 | Bachauer et al. | 75/231 |
| 2008/0095658 A1 | * | 4/2008 | Yokota et al. | 420/472 |
| 2010/0111753 A1 | | 5/2010 | Yoshitome et al. | |
| 2010/0266444 A1 | | 10/2010 | Yokota et al. | |
| 2011/0020171 A1 | | 1/2011 | Wada et al. | |
| 2011/0129173 A1 | | 6/2011 | Yokota et al. | |
| 2011/0224112 A1 | | 9/2011 | Mukai et al. | |

FOREIGN PATENT DOCUMENTS

| | | |
|---|---|---|
| EP | 1002883 A1 | 5/2000 |
| EP | 1717325 A1 | 11/2006 |
| JP | 4-131338 A | 5/1992 |
| JP | 9-249924 A | 9/1997 |
| JP | 11-269580 A | 10/1999 |
| JP | 3298636 B2 | 7/2002 |
| JP | 3370785 B2 | 1/2003 |
| JP | 3657742 B2 | 6/2005 |
| JP | 2005-179692 A | 7/2005 |
| JP | 2006-002578 A | 1/2006 |
| JP | 2006-037178 A | 2/2006 |
| JP | 2006-037179 A | 2/2006 |
| JP | 3929288 B2 | 6/2007 |
| WO | 2005/068671 A1 | 7/2005 |

OTHER PUBLICATIONS

Desaki, Toru, "Technical Trends of Plain Bearings for Automobile Drivetrain", Journal of Japanese Society of Tribologists, 2008, vol. 53, No. 9, pp. 599-604, w/ partial translation.
International Search Report of PCT/JP2010/057424, mailing date Oct. 5, 2010.

* cited by examiner

*Primary Examiner* — George Wyszomierski
*Assistant Examiner* — Ngoclan T Mai
(74) *Attorney, Agent, or Firm* — Westerman, Hattori, Daniels & Adrian, LLP (57) ABSTRACT

The present invention relates to sliding material provided by sintering a lead-free copper or copper alloy and contains at least one mineral selected from the group consisting of talc, mica, kaolinite mineral and montmorillonite mineral. Pb has conventionally been included in sliding materials for the purpose of obtaining conformability and seizure resistance. Despite the absence of Pb, the Pb-free copper-based sliding material and sliding parts according to the present invention have improved sliding properties.

20 Claims, 2 Drawing Sheets

Fig. 1

Fig. 2

LEAD-FREE COPPER-BASED SINTERED SLIDING MATERIAL AND SLIDING PARTS

TECHNICAL FIELD

The present invention relates to a sliding material provided by sintering copper or copper alloy. Particularly, the copper-based sintered sliding material and sliding parts according to the present invention are free of Pb, which has conventionally been included in sliding materials for the purpose of obtaining conformability and seizure resistance. Despite the absence of Pb, the sliding material according to the present invention has improved sliding properties.

BACKGROUND TECHNIQUE

General copper alloys are stipulated in Bronze Ingots for Castings (JIS H 2203), Phosphor Bronze Ingots for Castings (JIS H 2204), and Brass Ingots for Castings (JIS H 2205). Wrought phosphor bronze (JIS C 5191) and wrought brass (JIS C 2801) are also stipulated. The same components as these alloys are sintered, and the resultant alloys are used as sliding materials.

Generally speaking, sliding materials are used to control coefficient of friction between two opposing bodies. The sliding materials are roughly classified into one group aiming to lower coefficient of friction, such as material for application as an engine metal, and another group aiming to enhance coefficient of friction, such as material for application as a brake.

The sliding material according to the present invention has an objective to lower coefficient of friction and is used specifically for such parts as bearings and washers for vehicles, such as automobiles, and two-wheeled vehicles, and for construction machinery. The sliding material according to the present invention is also used for such parts of general machines.

When the same components as the bronze or phosphor bronze (JIS H 2204, PbCln2 and 3) are sintered to provide a sintered alloy, since these components fundamentally attain the objective as described above, this alloy is therefore used to produce a bearing for an automatic transmission; specifically, an end bearing. The end bearing is used in a one-way clutch of a shift gear in an automatic transmission. The one-way clutch is a sliding member positioned between an outer wheel and an inner wheel of the shift gear of the transmission. When the outer peripheral surface and the inner peripheral surface of the end bearing slide on the outer wheel and inner wheel, respectively, driving force is smoothly transmitted via the sliding member. When either the outer or inner wheel rotates, the load generated in a radial direction of each wheel is supported by the sliding member referred to as an end bearing. The copper-based sintered material is also used to produce a washer of a planetary pinion, which washer is a main structural element of the automatic transmission and is positioned between a pinion gear and a carrier.

Hard particles, which have been added to enhance the wear resistance of bronze and the like mentioned above, are of the following kind: $Fe_2P$, $Fe_3P$, FeB, $Fe_3B$, Co, Co-based self-fluxing alloy, Ni-based self-fluxing alloy, Fe—Cr, Fe—Mn, Fe—Ni, Fe—Si, Fe—W, Fe—Mo, Fe—V, Fe—Ti, Fe—Nb, CuP (Patent Document 1, Japanese Patent No. 3298636); aluminum nitride (Patent Document 2, Japanese Patent No. 3370785); Fe—Mn—Si based hard matter (Patent Document 3, Japanese Patent No. 3929288); Cu—Al intermetallic compound (Patent Document 4, Japanese Unexamined Patent Publication (kokai) No. 2002-256731), and the like.

Since Pb contained in the conventional copper-based sintered sliding material is environmentally problematic, Bi is used as a substitute for Pb, as described for example in Patent Document 5, WO 2005/068671. The material proposed in that document is as follows. The material contains Bi in an amount of 1 to 30%, and hard particles such as $Fe_2P$, $Fe_3P$, FeB, $Fe_2B$ and $Fe_3B$ and the like in an amount of 10 to 50%. The Bi phase, which is finer than the hard particles, is dispersed in the copper matrix. As an alternative of the fine dispersion, with regard to the Bi phase in contact with the hard particles, the document proposes that the contact length ratio of the hard particles to the length of the entire periphery of the Bi phase be 50% or less.

The Bi-containing Pb-free copper-alloy sintered material has improved seizure resistance because of the following reasons. Bi in the form of a soft phase can be finely and uniformly dispersed in the copper alloy. Adhesion of Bi on iron does not occur. And, Bi has low melting point. This material is at present most advisable for maintaining the seizure resistance of a Pb-free copper-alloy sliding material to an equivalent level of the lead-containing copper-alloy sintered material. The Bi-added sliding material is used for sliding parts of an automatic transmission (Non-patent Document 1: Tribologist (in Japanese) Vol. 53/No. 9/2008, pages 599-604).

It is known to disperse graphite or $MoS_2$, which is a general solid lubricant, in copper-alloy sintered material. Disadvantageously, graphite does not exhibit good sintering property to copper, and $MoS_2$ decomposes at sintering temperature. Therefore, several proposals have been made to solve these problems: In Patent Document 6, Japanese Unexamined Patent Publication (kokai) No. 2006-037178, oxidized Mo and sulfurized Cu are added. In Patent Document 7, Japanese Unexamined Patent Publication (kokai) No. 2005-179692, a sulfate compound and graphite are added. In Patent Document 8, Japanese Unexamined Patent Publication No. 2006-37179, plated $MoS_2$ particles are used. It is also noted that $MoS_2$ and graphite are expensive.

PRIOR ART

Patent Documents

Patent Document 1: Japanese Patent No. 3298636
Patent Document 2: Japanese Patent No. 3370785
Patent Document 3: Japanese Patent No. 3929288
Patent Document 4: Japanese Unexamined Patent Publication (kokai) No. 2002-256731
Patent Document 5: WO 2005/068671
Patent Document 6: Japanese Unexamined Patent Publication (kokai) No. 2006-37178
Patent Document 7: Japanese Unexamined Patent Publication (kokai) No. 2005-1179692
Patent Document 8: Japanese Unexamined Patent Publication (kokai) No. 2006-37179
Patent Document 9: Japanese Patent No. 3274161
Patent Document 10: Japanese Patent No. 3657742
Non-patent Document
[Non-patent Document 1] Tribologist Vol. 53/No. 9/2008, pages 599-604

DISCLOSURE OF INVENTION

Problems to be Solved by Invention

The additives, which have conventionally been used in the copper-based sintered sliding material, are evaluated as follows. First, Bi and Pb are soft and have good compatibility, but their wear resistance is poor. Second, the hard particles have excellent wear resistance but are liable to abrade opposing material. Last, such solid lubricant as graphite or molybdenum disulfide has good cleavage property. Material having a cleavage property level of molybdenum disulfide is limited.

Means for Solving Problems

The present inventors conducted energetic research for surmounting the level of prior art and thereby completed the present invention. That is, the present invention provides a sliding material provided by sintering a Pb-free copper alloy, which contains at least one mineral selected from a group consisting of talc, mica, kaolinite mineral, and montmorillonite mineral. This material may contain, if necessary, a conventional additive. The invention also provides sliding parts. Namely, Pb-free copper alloy is the main component of the sliding material according to the present invention. The copper alloy and talc, kaolinite mineral, and/or montmorillonite mineral, which may be hereinafter collectively referred to as "mineral component", are the essential components.

First, the entire construction of the sintered material according to the present invention is described. The sintered material according to the present invention consists of copper alloy in an amount of 50 mass % or more, and a mineral component. An optional component such as a known solid lubricant, hard particles and the like may be contained in amounts of 20 volume % or less. Talc, kaolinite mineral and/or montmorillonite mineral are essential in the mineral component. Preferably, the mineral component is present in an amount of 0.05 to 10 volume %. When the proportion of the mineral component exceeds 10 volume %, sliding properties are impaired. The copper alloy and the mineral component contain inevitable impurities. The impurities of the mineral component include decomposition products which are inevitably formed during production of the sintered material according to the present invention. The impurities of the mineral component also include gangue from a mine. Hereinafter, the copper, the mineral component and the optional components will be successively described.

The proportion of copper (alloy) to the entire sintered sliding material is preferably 80 to 99 mass %, more preferably 90 to 99 mass %, most preferably 95 to 99 mass %. When the proportion of copper (alloy) is excessively small, the sintered material will have poor strength. On the other hand, when the proportion of copper (alloy) is excessively high, the wear resistance and seizure resistance will become poor.

Copper alloy contain one or more of the following additive elements. Herein, the proportions of additive elements in copper alloy are based on the copper alloy.

(a) Sn: Sn is a general additive element of bronze and enhances sintering property and sliding property. Sn is preferably contained in an amount of 15 mass % or less, more preferably 3 to 10 mass %.

(b) P: P forms a liquid phase and thus facilitates sintering. P may be contained preferably in an amount of 1 mass % or less, more preferably 0.01 to 0.2 mass %.

(c) Bi: Bi forms a liquid phase and enhances compatibility and seizure resistance. Bi may be contained in an amount of 0.1 to 10 mass %.

(d) Al, Ni: These elements strengthen the matrix and enhance seizure resistance. Preferably Al is contained in an amount of 5 mass % or less and Ni in an amount of 10 mass % or less.

(e) Zn: Zn enhances resistance against sulfurization and may be contained in an amount of 30 mass % or less.

(f) In: In concentrates and form a layer having improved seizure resistance and may be contained in an amount of 5 mass % or less.

(g) Ag: Ag is dissolved in solid copper and enhances seizure resistance. In addition, Ag forms on the surface of copper a compound having improved lubricating properties (Patent Document 10, Japanese Patent No. 3657742). Ag may be contained in an amount of 10 mass % or less to achieve the effects mentioned above.

The above components (excepting Zn) may be contained up to 30 mass % or less in total. If Zn is present, the above components may be contained up to 40 mass % or less in total.

Next, the mineral component, which is the most characterizing element in the present invention, will be described.

Talc is a mineral belonging to pyrophyllite and has the following properties (a) to (e).

(a) The chemical formula is $Mg_3Si_4(OH)_2$.

(b) Mohs hardness is 1.
The main component of talc is $SiO_2$, which is a mineral having any of the following forms: quartz (Mohs hardness—7); tridymite (Mohs hardness—7); cristoballite (Mohs hardness—6.5); and stishovite (Mohs hardness—8.5 to 9). $SiO_2$ is therefore a mineral harder than talc. $SiO_2$ does not assume a layer structure described in (c).

(c) A $[Si_2O_5]_n^{2n-}$ layer and an $Mg(OH)_2$ layer form a crystal structure of talc. Since weak Van der Waals force acting between these layers bond them, they are liable to separate therebetween. Mineralogically, cleavage of talc is {001} perfect. From a point of view of sliding material, talc does not exhibit such an outstandingly low friction property as $MoS_2$, which has been conventionally used as a sliding-property modifier of copper and copper alloy to decrease its coefficient of friction. However, the present inventors discovered that talc stabilizes coefficient of friction as is described with reference to FIGS. 1 and 2. Therefore, the present inventors confirmed that talc is an effective additive to modify sliding properties.

(d) True specific gravity: 2.7-2.8

(e) Talc having a particle diameter of 50 μm or less is available in sheet form. Cost of the sheet-form talc is approximately 100 yen/kg. Supply source of talc is not limited.

Properties of the talc-added copper-alloy sintered material will next be described.

WEAR RESISTANCE

Figure 1:
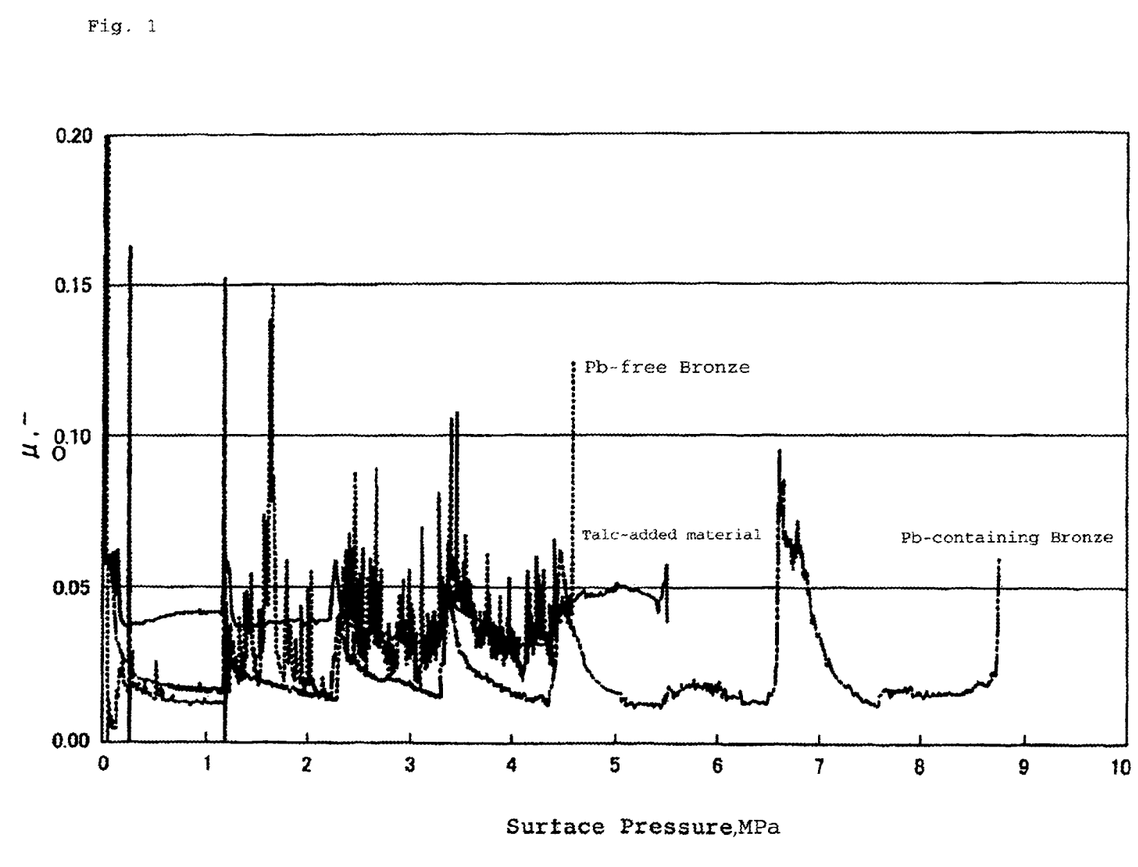
FIG. 1 A graph showing the measurement results of coefficient of friction with step-up increasing of load.

A talc-added copper-alloy sintered material, a lead-containing bronze sintered material and a Pb-free bronze sintered material were subjected to a thrust test for measuring a coefficient of friction. The results are shown in FIG. 1. The testing conditions are as follows.
Circumferential Speed: 1 m/s
Load: Stepping up by 1 MPa for 15 minutes
Lubricating Oil: liquid paraffin
Temperature of Fed Oil: 50 degrees C.
(Set) Oil Feeding Rate: 0.13 L/min As shown in FIG. 1, when load is increased stepwise, coefficient of friction steeply and momentarily rises and falls in the cases of lead-containing bronze and lead-free bronze. The rising and falling cycle of coefficient of friction is shorter in the case of lead-free bronze than in the case of lead-containing bronze. In contrast, talc-added copper alloy sintered material maintains almost constant coefficient of friction at a level slightly lower than approximately 0.05. It shows slight variation but not steep change. Bronze seriously wears out, when its coefficient of friction momentarily rises. Since the hardness of talc is low (as mentioned above in (b)), although poor wear resistance is generally anticipated, talc improves wear resistance. This is probably because the layer structure of talc (as mentioned above in (c)) stabilizes coefficient of friction.

Figure 2:
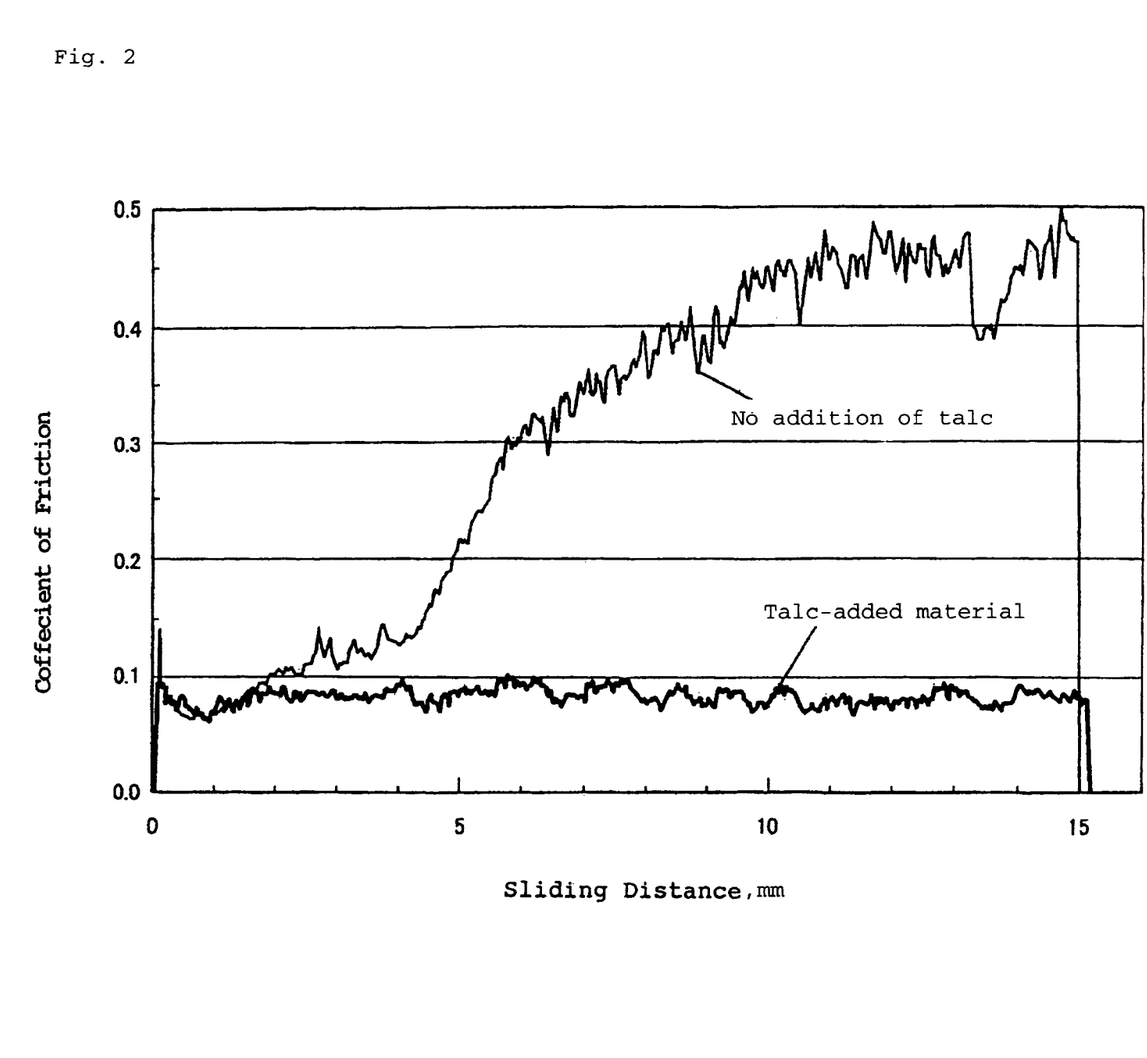
FIG. 2 A graph showing the results of a stick-slip test

The talc-added copper-alloy sintered material and lead-free bronze were subjected to measurement of a coefficient of friction by the stick-slip method. FIG. 2 shows the results of measurement. The test conditions are as follows.

Speed: 0.06 m/s
Load: 500 g
Lubrication: dry
Temperature: 150 degrees C.
Sliding: 15 mm per sliding in one direction.

As shown in FIG. 2, coefficient of friction of talc-added copper-alloy sintered material is stable. In contrast, coefficient of friction of talc-free and lead-free bronze gradually rises to reach an extremely high maximum value. Therefore, wear resistance of talc-added copper-alloy sliding material is improved, probably because of stably low coefficient of friction.

Seizure Resistance

When load is increased in the test described with reference to FIG. 1, any material finally results in seizure. Talc attains stabilization of coefficient of friction and enhances seizure resistance.

Next, mica, which is an additive, will be described. Mica has the following properties.
(a) Chemical composition: $KAl_2 \cdot AlSi_3O_{10}(OH)_2$, $KMg_3 \cdot AlSi_3O_{10}(OH)_2$ or the like.
(b) The Mohs hardness of white mica is 2.5 to 4 and that of black mica is 2.5 to 3, which means mica is soft.
(c) Mica is a silicate mineral having a hexagonal network structure, like talc. The crystal structure is a layer-structure of tetrahedron and octahedron. Therefore, cleavage between the layers is likely to occur.
(d) True specific gravity: 2.8 to 3.0.
(e) Sheet form mica is available.

Kaolinite mineral has the following properties.
(a) Chemical composition: $Al_2Si_2O_6(OH)_4$.
(b) Mohs hardness: 1 to 2.
(c) Structure: flaky layer-structure.
(d) True specific gravity: 2.6.

Montmorillonite mineral has the following properties.
(a) Chemical composition of montmorillonite mineral:

$(Na,Ca)_{0.33}(Al,Mg)_2Si_4O_{10}(OH)_2 \cdot nH_2O$ (b) Mohs hardness: 1 to 2.
(c) It has a layer structure and a cleaving property.
(d) Montmorillonite clay is referred to as bentonite. Montmorillonite which is different from bentonite and has a particle diameter of 10 to 100 μm, is available. Montmorillonite is used in the sliding materials as "clay" and is effective for stabilizing coefficient of friction of copper alloy. Improvement of sliding properties of copper alloy by montmorillonite clay is not so fundamental as talc. Contrary to this, the contact area of montmorillonite mineral having certain size with an opposing shaft is increased so that sliding properties are greatly improved as in the case of talc.
(e) True specific gravity: 2.4.

The mineral-added copper-alloy sintered sliding material according to the present invention may contain the optional component(s) in amounts up to 20% by volume in total. Specifically, in order to impart low frictional property, 0.1 to 5 mass %, particularly 3 mass % or less of graphite, $MoS_2$, $WS_2$, or the like may be added.

The hard particles are another optional component. The hard particles listed in Paragraphs 0005 and 0006 may be added to enhance wear resistance and seizure resistance. Preferably, $Fe_2P$, $Fe_3P$, $FeB$, $AlN$, $Mo_2C$, $BN$, $SiO_2$, $Si_3N_4$, or the like having a particle diameter of 50 μm or less may be added in an amount of 5 mass % or less.

When talc and copper alloy are sintered, talc inevitably partially decomposes at 450 to 600 degrees C. into enthtatite. Enstatite has the following properties.
(a) Chemical composition formula: $Mg_2Si_2O_6$.
(b) The Mohs hardness is 4 to 4.5.
(c) In the structure, a unit cell of diopsite is repeated to form twins. Enstatite has higher hardness as compared with talc and does not have a layer structure. However, enstatite does not impede the properties of copper-based sintered alloy sliding material according to the present invention, as long as undecomposed talc is present in a certain amount, specifically in an amount less than approximately 10% by volume. Nevertheless, the amount of enstatite preferably does not exceed the amount of talc. Any impurity mineral originating from a mine and having a hardness similar to that of enstatite, may be similarly handled.

Next, the method for producing a mineral-added copper alloy sintered material according to the present invention is described. First, copper alloy powder of an average particle diameter of 150 μm or less, mineral component powder having an average particle diameter of approximately 20 μm, and, if necessary, optional component powder are prepared, and, then, the powders are thoroughly mixed. The mixture is sprayed on a steel sheet to a thickness of 0.5 to 1.5 mm. Primary sintering is carried out in a temperature range of 700 to 1000 degrees C. for 1 second to 30 minutes in reducing protective atmosphere. An intermediate rolling is then carried out. Secondary sintering is carried out again within the same conditional range of primary sintering. Rolling may be subsequently carried out, if necessary, at a working ratio of 10% or less for the purpose of adjusting hardness and size. Finally, finishing is performed to form parts of desired shape, such as a bush. The sliding surface of the parts is machined for example by cutting, to provide a desired surface roughness to be in contact with an opposite shaft. Preferably, the sintered layer is has a thickness of 200 to 700 μm.

Effects of Invention

Talc-added copper-alloy sintered sliding materials of the present invention and conventional materials are evaluated for their properties in three ranks of excellent, improved and acceptable. The results are shown in the following table.

TABLE 1

| No. | Materials | Wear Resistance | Seizure Resistance |
|---|---|---|---|
| 1 | Pb-free Bronze | Improved | Improved |
| 2 | Talc-added Copper-Alloy Sintered | Excellent | Excellent |

TABLE 1-continued

| No. | Materials | Wear Resistance | Seizure Resistance |
|---|---|---|---|
| 3 | Sliding Material Talc • Bi-added Copper Alloy Sintered Sliding Material | Excellent | Excellent |
| 4 | Bi-added Bronze | Acceptable | Excellent |
| 5 | Bi • Hard Particle-added Bronze | Excellent | Excellent |
| 6 | Bi-added Phosphor Bronze | Acceptable | Excellent |
| 7 | Bi • hard particle added Bronze | Excellent | Excellent |

The talc-added copper-alloy sintered sliding material (2) according to the present invention has improved properties over the lead-free bronze (1). It is therefore clear that talc is a component that modifies sliding properties. Although the material (2) is free of Bi and Pb, its properties are equivalent to those of the Pb•hard particle added bronze 6, and Bi•hard particle added bronze (7). The talc•Bi added copper-alloy sintered material according to the present invention (3) is equivalent to the Pb•hard particle added bronze (6) and the Bi-hard particle added bronze (7). The mineral components other than talc exhibits the same three-level evaluation.

Best Mode for Carrying Out Invention

The copper-alloy sintered materials having blending compositions shown in Table 2 were prepared using the following raw materials.

Copper-Alloy: Cu-3 to 10% Sn alloy powder occasionally containing Al, Ni, In and the like. Atomized powder has an average particle diameter of 150 μm or less.

Mineral Components Ores are sieved to obtain a powder having an average particle diameter of 23 μm. However, the enstatite has an average particle diameter of 25 μm.

Graphite-average particle diameter—25 μm
$MoS_2$—average particle diameter—23 μm In Table 2, Sn, P, Bi and "others" are the components of the tested copper alloys and are expressed in percentage relative to the copper alloys. The contents of mineral components and optional components are expressed based on the entirety of the material.

The above-described raw material powders were mixed with a V-type blender and were dispersed on a 1.5-mm thick steel sheet to a thickness of 800 to 1200 μm. Then, sintering was carried out in an electric furnace having a reducing protective atmosphere at 850 to 900 degrees C. for 20 minutes. Subsequently, the thickness of the sintered layer was reduced by 500 μm through rolling. Secondary sintering was carried out under the same conditions. Material in the form of a bimetal was thus obtained and was then wrought into a bush. The resultant bush was tested for seizure resistance and wear resistance under the conditions described below. Approximately 50% of talc decomposes into enstatite under the sintering conditions describe above. The amount of talc shown in Table 2 is the blending amount, as described above.

Method for Testing Seizure Resistance
Pin-on-Disc Test
Circumferential Speed: 1 m/s
Load: Increased stepwise by 1 MPa/15 min
Lubrication: Paraffin-Base Oil
Method for Testing Wear Resistance
A Bush-journal Wear Testing Machine
Circumferential Speed: 1 m/s. Start stop cycle.
Load: 2 MPa
Lubrication: Paraffin-Base Oil The test results are shown in Table 2.

TABLE 2

| | Components, mass % | | | | | | | | | | | Properties | |
|---|---|---|---|---|---|---|---|---|---|---|---|---|---|
| | | | | | | | Mineral Component (vol %) | | | | | Seizure | |
| Test Nos. | Component of Copper Alloy | | | | | Talc | Mica | Kaolinite | Montmorillointe | Enstatite | Optional Component (mass %) | Surface Pressure MPa | Wear Amount μm |
| | Cu | Sn | P | Bi | Others | | | | | | | | |
| 1 | Bal | 3 | — | — | — — | 1 | — | — | — | — | — — | 10 | 5 |
| 2 | ↑ | 3 | — | — | — — | 3 | — | — | — | — | — — | 12 | 2 |
| 3 | ↑ | 3 | 0.1 | — | — — | 5 | — | — | — | — | — — | 12 | 2 |
| 4 | ↑ | 5 | — | — | — — | 1 | — | — | — | — | — — | 10 | 4 |
| 5 | ↑ | 5 | 0.1 | — | — — | 3 | — | — | — | — | — — | 14 | 2 |
| 6 | ↑ | 5 | — | — | — — | 5 | — | — | — | — | — — | 16 | 2 |
| 7 | ↑ | 5 | — | — | — — | 10 | — | — | — | — | — — | 10 | 2 |
| 8 | ↑ | 10 | — | — | — — | 1 | — | — | — | — | — — | 10 | 6 |
| 9 | ↑ | 10 | — | — | — — | 3 | — | — | — | — | — — | 11 | 2 |
| 10 | ↑ | — | — | — | Zn 25 | 3 | — | — | — | — | — — | 10 | 4 |
| 11 | ↑ | 5 | — | — | Ni 5 | 5 | — | — | — | — | — — | 8 | 1 |
| 12 | ↑ | 3 | — | — | In 5 | 3 | — | — | — | — | — — | 15 | 2 |
| 13 | ↑ | 3 | — | — | Al 3 | 1 | — | — | — | — | — — | 11 | 2 |
| 14 | ↑ | 5 | — | 5 | — — | 3 | — | — | — | — | — — | 24 | 1 |
| 15 | ↑ | 3 | — | — | — — | 3 | — | — | — | — | Graphite 1 | 20 | 3 |
| 16 | ↑ | 5 | — | — | — — | 5 | — | — | — | — | $MoS_2$ 1 | 18 | 6 |
| 17 | ↑ | 5 | 0.1 | — | — — | — | — | — | — | — | — — | 10 | 8 |
| 18 | ↑ | 3 | 0.2 | — | — — | — | 5 | — | — | — | — — | 10 | 5 |
| 19 | ↑ | 3 | — | — | — — | — | — | 3 | — | — | — — | 13 | 8 |
| 20 | ↑ | 5 | — | — | — — | — | — | — | 5 | — | — — | 12 | 6 |
| 21 | ↑ | 3 | — | — | — — | — | — | — | 5 | — | — — | 5 | 30 |
| 22 | ↑ | 5 | 0.1 | — | — — | — | — | — | — | — | — — | 3 | 15 |
| 23 | ↑ | 10 | — | — | — — | — | — | — | — | — | — — | 3 | 12 |
| 24 | ↑ | 5 | — | — | Zn 25 | — | — | — | — | — | — — | 3 | 34 |
| 25 | ↑ | 5 | — | — | Ni 5 | — | — | — | — | — | — — | 2 | 10 |
| 26 | ↑ | 3 | — | — | In 5 | — | — | — | — | — | — — | 6 | 36 |
| 27 | ↑ | — | — | — | — — | — | — | — | — | 10 | — — | 6 | 2 |

In Table 2, Test Nos. 1 to 21 are inventive examples, while Test Nos. 21 to 27 are comparative examples. Since comparative examples Nos. 19 to 26 are free of mineral component, the seizure resistance is poor. In addition, since the mineral component of comparative example No. 27 contains only enstatite as the mineral component, the seizure resistance is poor. The inventive examples are classified as follows.

(A) Solid-lubricant Free (Nos. 1-14)
  (a) Bi-free (Nos. 1 to 13)
  (b) Bi-containing (No. 14)
(B) Containing Solid-lubricant (Nos. 15, 16)

Sliding properties are improved in the sequential order of (A)(b)>(B)>(A)(a)>Comparative Examples

INDUSTRIAL APPLICABILITY

As is described hereinabove, the present invention provides improvement of bronze in terms of wear resistance and seizure resistance, while reducing material cost. Since the business field of sliding parts requires enhancement of performance and reduction of cost, contribution of the present invention to this business field is very high. The prices of copper and phosphor bronze vary approximately 300 to 1000 yen/kg. The price of copper-based sintering material is based on such copper material. An example additive for modifying sliding properties of the copper material is bismuth, which costs approximately 2000 yen/kg. Almost all the additives excepting lead tend to increase the price. However, since lead is environmentally problematic, it's use is limited. In sliding materials, bismuth is used not only as a substitution for lead but is also used broadly as a free cutting element. Therefore, there is a concern that bismuth resources may become depleted. In contrast, no such concern is involved in talc. In addition, cost-effectiveness is attained without impairing the sliding properties of the lead-free Bi-containing copper-alloy sintered sliding material, which exhibits the most improved sliding properties at present.

The invention claimed is:

1. A lead-free copper-based sintered sliding material, consisting of:
  a lead-free copper alloy consisting of at least one of the following (a) through (e) and a balance of Cu and inevitable impurities:
    (a) 15 mass % or less of Sn;
    (b) 1 mass % or less of P;
    (c) from 0.1 to 10 mass % of Bi;
    (d) 30 mass % or less in total of at least one of 5 mass % or less of Al, 10 mass % or less of Ni, 5 mass % or less of In; and
    (e) 40 mass % or less in total of at least one of 5 mass % or less of Al, 10 mass % or less of Ni, greater than 0 to 30 mass % of Zn, 5 mass % or less of In;
  and,
  a mineral consisting of
    talc and impurities;
    enstatite, wherein the amount of said enstatite is less than the volume amount of said talc; and
    optionally, one or both of kaolinite mineral and montmorillonite mineral.

2. The lead-free copper-based sintered sliding material according to claim 1, wherein the content of said mineral is from 0.5 to 0.05 to 10 volume % relative to the entity of the sintered sliding material.

3. The lead-free copper-based sintered sliding material according to claim 1 or 2, wherein said mineral consists of said talc and impurities, as well as one or both of kaolinite mineral and montmorillonite mineral.

4. A sliding part comprising a lead-free copper-based sintered sliding material according to claim 1.

5. The sliding part according to claim 4, wherein the content of said mineral is from 0.05 to 10 volume % relative to the entity of the sintered sliding material.

6. The sliding part according to claim 4 or 5, wherein said mineral consists of said talc and impurities, as well as one or both of kaolinite mineral and montmorillonite mineral.

7. The sliding part according to claim 4 or 5, wherein a surface thereof in contact with an opposite shaft is finished by machining.

8. A bearing for an automatic transmission, comprising the lead-free copper-based sliding material according to claim 1.

9. A lead-free copper-based sintered sliding material, consisting of:
  a lead-free copper alloy consisting of at least one of the following (a) through (e) and a balance of Cu and inevitable impurities:
    (a) 15 mass % or less of Sn;
    (b) 1 mass % or less of P;
    (c) from 0.1 to 10 mass % of Bi;
    (d) 30 mass % or less in total of at least one of 5 mass % or less of Al, 10 mass % or less of Ni, 5 mass % or less of In; and
    (e) 40 mass %, mass % or less in total of at least one of 5 mass % or less of Al, 10 mass % or less of Ni, greater than 0 to 30 mass % of Zn, 5 mass % or less of In;
  a mineral consisting of
    talc and impurities;
    enstatite, wherein the amount of said enstatite is less than the volume amount of said talc; and,
    one or both of solid lubricant and a hard particle, wherein said hard particle is selected from the group consisting of $Fe_2P$, $Fe_3P$, FeB, AlN, $Mo_2C$, BN, $SiO_2$ and $Si_3N_4$; and
    optionally, one or both of kaolinite mineral and montmorillonite mineral.

10. The lead-free copper-based sintered sliding material according to claim 9, wherein the content of said mineral is from 0.05 to 10 volume % relative to the entity of the sintered sliding material.

11. The lead-free copper-based sintered sliding material according to claim 9 or 10, wherein said mineral consists of said talc and impurities, as well as one or both of kaolinite mineral and montmorillonite mineral.

12. The lead-free copper-based sintered sliding material according to claim 9 or 10, wherein the contents of said solid lubricant and said hard particles are 0.1 to 0.5 mass % and 1 mass % or less, respectively, based on the entity of the sintered sliding material.

13. The lead-free copper-based sintered sliding material according to claim 12, wherein said mineral consists of said talc and impurities, as well as one or both of kaolinite mineral and montmorillonite mineral.

14. The sliding part comprising the lead-free copper-based sliding material according to claim 9.

15. The sliding part according to claim 14, wherein the content of said mineral is from 0.05 to 10 volume % relative to the entity of the sintered sliding material.

16. The sliding part according to claim 14 or 15, wherein said mineral consists of said talc and impurities, as well as one or both of kaolinite mineral and montmorillonite mineral.

17. The sliding part according to claim 14 or 15, wherein the contents of said solid lubricant and said hard particles are 0.1 to 0.5 mass % and 1 mass % or less, respectively, based on the entity of the sintered sliding material.

18. The sliding part according to claim 17, wherein said mineral consists of said talc and impurities, as well as one or both of kaolinite mineral and montmorillonite mineral.

19. The sliding part according to claim 14 or 15, wherein a surface thereof in contact with an opposite shaft is finished by machining.

20. A bearing for an automatic transmission, comprising the lead-free copper-based sliding material according to claim 9.

* * * * *

UNITED STATES PATENT AND TRADEMARK OFFICE
CERTIFICATE OF CORRECTION

PATENT NO. : 8,845,776 B2
APPLICATION NO. : 13/265248
DATED : September 30, 2014
INVENTOR(S) : Ryo Mukai et al.

It is certified that error appears in the above-identified patent and that said Letters Patent is hereby corrected as shown below:

In the Specification

Column 6, Line 18

Change

"enthtatite"

To Be

--enstatite--

In the Claims

Column 9, Line 62, Claim 2

Change

"0.5 to 0.05 to 10 volume %"

To Be

--0.05 to 10 volume %--

Column 9, Line 66, Claim 3

Change

"talc and impurities"

To Be

--talc and impurities and enstatite--

Signed and Sealed this
Seventh Day of April, 2015

Michelle K. Lee
*Director of the United States Patent and Trademark Office*

CERTIFICATE OF CORRECTION (continued)
U.S. Pat. No. 8,845,776 B2

<u>Column 10, Line 7, Claim 6</u>

Change

"talc and impurities"

To Be

--talc and impurities and enstatite--

<u>Column 10, Line 45, Claim 11</u>

Change

"talc and impurities"

To Be

--talc and impurities and enstatite--

<u>Column 10, Line 54, Claim 13</u>

Change

"talc and impurities"

To Be

--talc and impurities and enstatite--

<u>Column 10, Line 62, Claim 16</u>

Change

"talc and impurities"

To Be

--talc and impurities and enstatite--

<u>Column 11, Line 2, Claim 18</u>

Change

"talc and impurities"

To Be

--talc and impurities and enstatite--